US011029954B2

(12) United States Patent
Fung et al.

(10) Patent No.: US 11,029,954 B2
(45) Date of Patent: Jun. 8, 2021

(54) PER-LANE DYNAMIC INDEXING IN TEMPORARY REGISTERS (71) Applicant: Samsung Electronics Co., Ltd., Suwon-si (KR)

(72) Inventors: Wilson Wai Lun Fung, Milpitas, CA (US); Mrinal Deo, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 29 days.

(21) Appl. No.: 16/445,199

(22) Filed: Jun. 18, 2019

(65) Prior Publication Data
US 2020/0334037 A1    Oct. 22, 2020

Related U.S. Application Data (60) Provisional application No. 62/837,186, filed on Apr. 22, 2019.

(51) Int. Cl.
G06F 9/30 (2018.01)
G06F 9/355 (2018.01)
G06F 9/38 (2018.01)
G06F 7/57 (2006.01)

(52) U.S. Cl.
CPC ............ *G06F 9/3012* (2013.01); *G06F 9/355* (2013.01); *G06F 9/3887* (2013.01); *G06F 7/57* (2013.01)

(58) Field of Classification Search
None
See application file for complete search history.

(56) References Cited

U.S. PATENT DOCUMENTS

| 7,477,260 B1* | 1/2009 | Nordquist | G09G 5/363 345/536 |
| 7,489,315 B1* | 2/2009 | Nordquist | G09G 5/22 345/501 |
| 7,925,860 B1* | 4/2011 | Juffa | G06F 9/3887 712/10 |
| 8,266,382 B1* | 9/2012 | Minkin | G06F 13/28 711/118 |
| 8,639,882 B2* | 1/2014 | Choquette | G06F 9/3009 711/126 |
| 8,725,989 B2 | 5/2014 | Madajczak | |
| 9,354,892 B2 | 5/2016 | Rogers et al. | |
| 9,665,969 B1 | 5/2017 | Gadre et al. | |
| 10,007,518 B2 | 6/2018 | Anderson et al. | |

(Continued)

*Primary Examiner* — Michael Sun
(74) *Attorney, Agent, or Firm* — Renaissance IP Law Group LLP (57) ABSTRACT According to one general aspect, an apparatus may include execution unit circuits, each configured to access one or more pieces of data. The apparatus may include local register file circuits, each associated with a respective execution unit circuit and each configured to store data. The apparatus may include a main register circuit. The main register circuit may include a main register file circuit configured to store data. The main register circuit may include a local index register circuit configured to map an index supplied by the main register file circuit to a storage location in the local register file circuits. The main register circuit may be configured to: receive from a control circuit a request to access the storage location of the specified data, and supply a target local register file circuit with the target local register file circuit's storage location of the specified data.

20 Claims, 5 Drawing Sheets (56) References Cited

U.S. PATENT DOCUMENTS

| | | | |
|---|---|---|---|
| 10,140,123 B2* | 11/2018 | Mantor | G06F 9/30098 |
| 2012/0079503 A1* | 3/2012 | Dally | G06F 9/3851 |
| | | | 718/108 |
| 2019/0205132 A1* | 7/2019 | Bui | G06F 16/9017 |

* cited by examiner

PER-LANE DYNAMIC INDEXING IN TEMPORARY REGISTERS

CROSS-REFERENCE TO RELATED APPLICATION

This application claims priority under 35 U.S.C. § 119 to Provisional Patent Application Ser. No. 62/837,186, entitled "PER-LANE DYNAMIC INDEXING IN TEMPORARY REGISTERS" filed on Apr. 22, 2019. The subject matter of this earlier filed application is hereby incorporated by reference.

TECHNICAL FIELD

This description relates to register memories, and more specifically to per-lane dynamic indexing in temporary registers.

BACKGROUND

A register file is generally an array of processor registers in a central processing unit (CPU). Modern integrated circuit-based register files are usually implemented by way of fast static random access memories (RAMs) with multiple ports. Such RAMs are distinguished by having dedicated read and write ports, whereas ordinary multi-ported RAMs will usually read and write through the same ports.

The instruction set architecture of a CPU will usually define a set of registers which are used to stage data between memory and the functional units on the chip. In simpler CPUs, these architectural registers correspond one-for-one to the entries in a physical register file (PRF) within the CPU. More complicated CPUs use register renaming, so that the mapping of which physical entry stores a particular architectural register changes dynamically during execution. The register file is generally part of the architecture and visible to the programmer, as opposed to the concept of transparent caches.

Single instruction, multiple data (SIMD) computer is a class of parallel computers. It includes computers with multiple processing elements that perform substantially the same operation on multiple data points substantially simultaneously. Such machines exploit data level parallelism. Typically SIMD computers and SIMD instructions involve simultaneous (parallel) computations, but only a single process (instruction) at a given moment. SIMD is particularly applicable to common tasks such as adjusting the contrast in a digital image or adjusting the volume of digital audio. Most modern CPU designs include SIMD instructions to improve the performance of multimedia use.

A graphics processing unit (GPU) is a specialized electronic circuit designed to rapidly manipulate and alter memory to accelerate the creation of images in a frame buffer intended for output to a display device. GPUs are used in embedded systems, mobile phones, personal computers, workstations, and game consoles. Modern GPUs are very efficient at manipulating computer graphics and image processing. Their highly parallel structure makes them more efficient than general-purpose central processing units (CPUs) for techniques that process large blocks of data in parallel (e.g., SIMD instructions). In a personal computer, a GPU can be present on a video card or embedded on the motherboard. In certain CPUs, they are embedded on the CPU die.

SUMMARY

According to one general aspect, an apparatus may include one or more execution unit circuits, each configured to access one or more pieces of data. The apparatus may include one or more local register file circuits, each associated with a respective execution unit circuit and each configured to store data. The apparatus may include a main register circuit. The main register circuit may include a main register file circuit configured to store data. The main register circuit may include a local index register circuit configured to map an index supplied by the main register file circuit to a storage location in the local register file circuits. The main register circuit may be configured to: receive from a control circuit a request to access the storage location of the specified data, and supply a target local register file circuit with the target local register file circuit's storage location of the specified data.

According to another general aspect, a system may include a processor core. The processor core may include one or more execution unit circuits, each configured to access one or more pieces of data. The processor core may include one or more local register file circuits, each associated with a respective execution unit and each configured to store data. The processor core may include a main register circuit, the main register circuit comprising a local index register circuit configured to store, for each local register file, an active index value, and wherein configured to, in response to a request from a control circuit to access a target execution unit circuit, supply the active index value associated with the target execution unit circuit. The system may include an off-core memory circuit configured to store data.

According to another general aspect, an apparatus may include a plurality of execution unit circuits, each configured to access one or more pieces of data. The apparatus may include a plurality of local register file circuits, each associated with a respective execution unit and each configured to store pieces of data. The apparatus may include a main register circuit. The main register circuit may include a main register file circuit configured to store data for at least part of the plurality of execution unit circuits. The main register circuit may include a local index register circuit configured to identify an active storage location in the plurality of local register files. The main register circuit may include a control circuit configured to: issue an instruction to a target execution unit circuit, and instruct the local index register circuit to access, at the active storage location, the local register file associated with the target execution unit circuit.

The details of one or more implementations are set forth in the accompanying drawings and the description below. Other features will be apparent from the description and drawings, and from the claims.

A system and/or method for register memories, and more specifically to per-lane dynamic indexing in temporary registers, substantially as shown in and/or described in connection with at least one of the figures, as set forth more completely in the claims.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
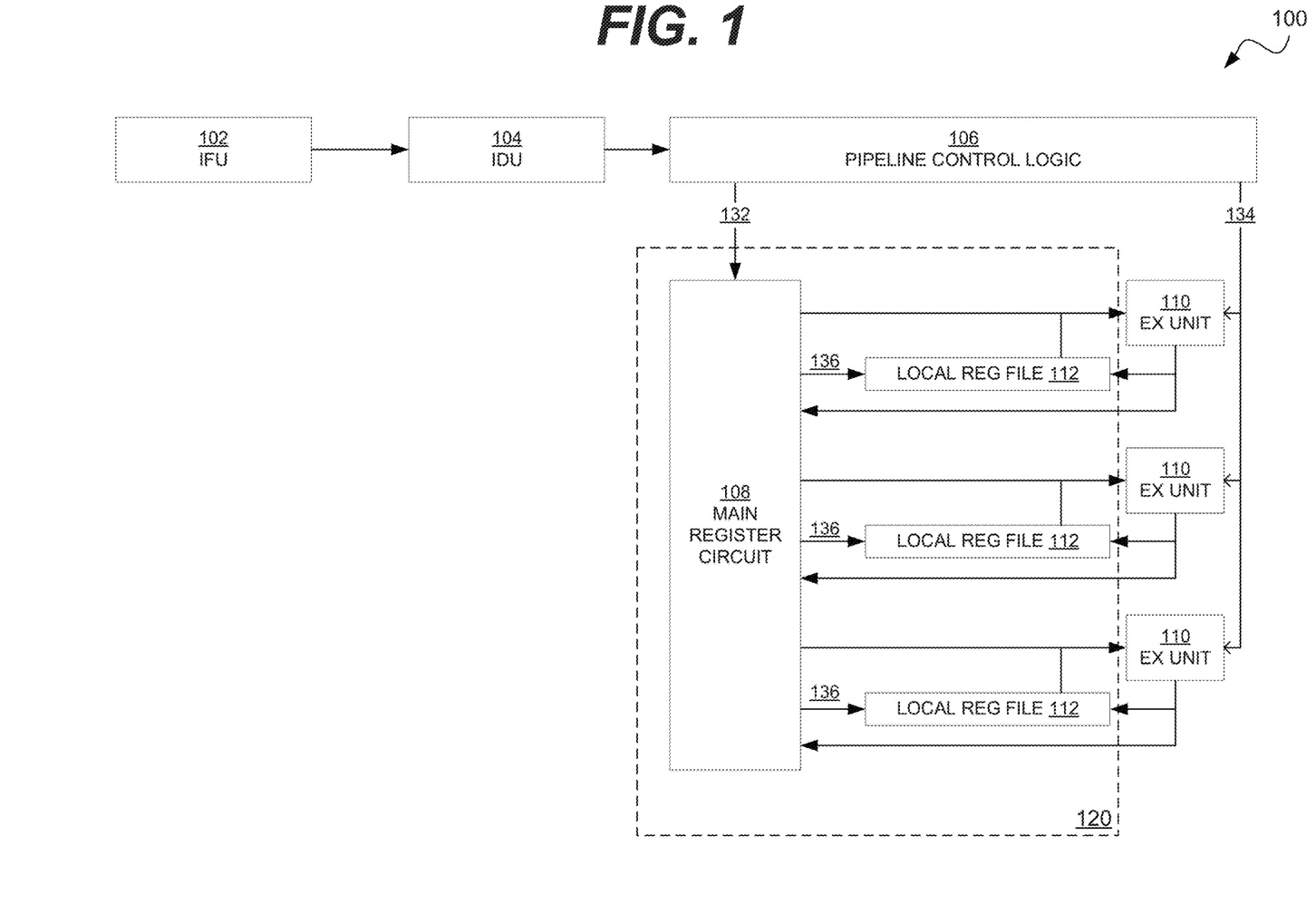
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system may be part of a processor or processor core. In various embodiments, the processor may be part of a CPU, GPU, system-on-a chip (SoC), or other computing device such as, for example, a laptop, desktop, workstation, personal digital assistant, smartphone, tablet, and other appropriate computers or a virtual machine or virtual computing device thereof.

In various embodiments, the system 100 may include one or more pipeline or execution units or circuits. In the illustrated embodiment, the pipeline or execution units or circuits are represented by the instruction fetch unit (IFU) 102 and the instruction decode unit (IDU) 104. In such an embodiment, the IFU 102 may be configured to retrieve the next instruction or operation (typical from an instruction cache) and place it in the processor's pipeline. The IDU 104 may be configured to convert the instruction is converted into signals that control other parts of the system 100 and may be routed to appropriate execution units (e.g., execution units 110).

In the illustrated embodiment, the system 100 may include a pipeline control logic or circuit 106 configured to issue instructions for execution units 110, and provide them with operands or pieces of data that are associated with the instructions. For example, if the instruction is to add 1 and 2, then the numbers 1 and 2 would be operands. However, in the world of computers the operands would not be use the values 1 and 2 but the registers (e.g., registers A & B) which might store those values.

In the illustrated embodiment, the system 100 may include a hierarchal register file 120 comprising a number of registers or relatively fats memory locations. These registers may store data and may be used or referred to as operands of various instructions.

In the illustrated embodiment, the system 100 may include one or more execution units or circuits 110. In various embodiments, multiple instantiations of the execution units 110 may exists, such that multiple instructions may be processed substantially simultaneously. In various embodiments, the execution units 110 may include arithmetic logic units (ALUs), floating point units (FPUs), other circuitry that performs other mathematical or transformational operations; although, it is understood that the above are merely a few illustrative examples to which the disclosed subject matter is not limited.

In various embodiments, a SIMD processor may include multiple lanes of execution units 110. The lanes of execution units 110 may be organized so that they execute the same instruction in lock-step. This may allow them to share a common pipeline control logic 106, so that control signals from a single instruction is broadcasted across all the lanes. For example of a SIMD instruction, a single ADD instruction may cause multiple pieces of data to be added, one by each of the execution units 110.

In various embodiments, the system 100 may supply the operands to this array of execution units 110 via a register files 120 (e.g., a vector register file (VRF)), which may be implemented using wide-port SRAMs. When the system 100 executes a single instruction, each operand may be read from a single row of the register file 120 and fed into multiple lanes of execution units 110. Similarly, the result of each instruction may be written into a single row of the register file 120 as the instruction completes execution.

In various embodiments, the hierarchical register file 120 may include a relatively large or main register file 108. This main register file 108 may include multiple banks of relatively large memory cells and also provide sufficient bandwidth to sustain the wide SIMD datapaths. In some embodiments, this large main register file 108 and the operand access it supports may be a major power consumer on most GPU designs.

In various embodiments, the hierarchical register file 120 may also include a number of relatively small local register files 112. These local register files 112 may reduce the operand access power. In some embodiments, the local register files 112 may be tightly coupled with a lane of execution units 110, and may be associated on a one-to-one basis.

In such an embodiment, the local register files 112 may consume less power on each access and be employed to store frequently used program variables. The main register file 108 may then be shared amongst the execution units 110 and be responsible for larger and/or less frequently used program data, providing the storage capacity required by the large number of threads that multiplexes their executions in the same SIMD processor.

Traditionally, the compiler would not know or be able to predict what register would be accessed by the instruction, and would refer to the register by a base value plus an index value. To determine which register should be accessed, the control logic 106 would compute the proper calculation of the base plus the index and then broadcast that memory address to the local register files 112. In such an embodiment, the local register files 112 would occur in lockstep with a single index value being used to address operands across every local register file 112. Further, this computation (base plus index), meant the control logic 106 would have to perform a preliminary computation (and use memory and power to do so) before the actual instruction may be performed.

In the illustrated embodiment, the system 100 may include a hierarchical register file 120 with flexible addressing capability in the local register files 112. In such an embodiment, each lane of the local register files 112 may be dynamically indexed or addressable using a different index may be provided from the main register circuit 108.

In such an embodiment, the main register circuit 108 may be configured to maintain an active index, storage location, or memory address for each local register file 112. The control logic 106 may provide the main register circuit 108 with a register or lane identifier 132. The main register circuit 108 may translate or map this register or lane identifier 132 to a local register identifier or index 136. The main register circuit 108 may supply this index 136 to the respective local register file 112.

In such an embodiment, the respective local register file 112 may use that local register identifier or index 136 to retrieve the desired operand (or data associated with operand) and supply it to the execution unit 110. In another embodiment, the local register identifier or index 136 may also be used to specify the destination operand in the local register file 112 to be written by value from the execution unit 110. The execution unit 110 may perform the desired operation (e.g., addition), and return values to either one or both of the local register file 112 or the main register circuit 108. Likewise, in various embodiments, if the requested data is not in the local register file 112, it may be supplied to the execution unit 110 by the main register circuit 108.

In such an embodiment, the active index or memory locations of each local register file 112 may be independent or dynamically different than the other local register files 112. As shown in FIG. 2B, the active indexes need not move in lock-step. In such an embodiment, the computation of the proper register (base plus index) need not occur prior to the execution of the instruction. Thus, power and time may be saved.

In various embodiments, the system 100 may be configured to operate in two modes. A traditional mode for software execution wherein the software has not been encoded for the dynamic indexing of the local register files 112, and an optimized mode where the software has been so encoded. For example, take the following code.

```
for (y = 0; y < 5; y++) {
    for (x = 0; x < 5; x++) {
        histo[index]++;
    }
}
```

A compiler not designed or configured to take advantage of the per-lane indexing capability of system 100 may generate assembly code, such as, for example:

LD.SHARED Rj, [Rbase+Ri];
IADD Rj, Rj, 1;
ST.SHARED Rj, [Rbase+Ri];

where data is loaded from the memory address computed by Rbase+Ri (where i is an index) to the register Rj, then the instruction (IADD) is performed (add 1 to Rj and store back in Rj), then the result (now in Rj) is placed back to the memory address computed by Rbase+Ri. As one can see, in one embodiment, a read-modify-write (MRW) may take 3 instructions to perform. In such an embodiment, a memory is usually used to store and compute the Rbase+Ri value.

Conversely, a compiler designed or configured to take advantage of the per-lane indexing capability of system 100 may generate assembly code, such as, for example:

IADD LR[Ri], LR[Ri], 1

The first thing to notice is the last of load (LD) and store (ST) instructions, resulting in a savings of ~66% with a single instruction (IADD). In such an embodiment, the LR stands for local register file 112, and the program variable "index" may loaded into Ri (e.g., by the main register circuit 108). Further, there is no need to resort to a scratchpad memory tom compute a memory location from a base value (e.g., Rbase).

In various embodiments, the system 100 may be configured to operate in either mode, depending upon the code executed. In another embodiment, the system 100 may be configured to process all instructions using the per-lane indexing mode.

Figure 2A:
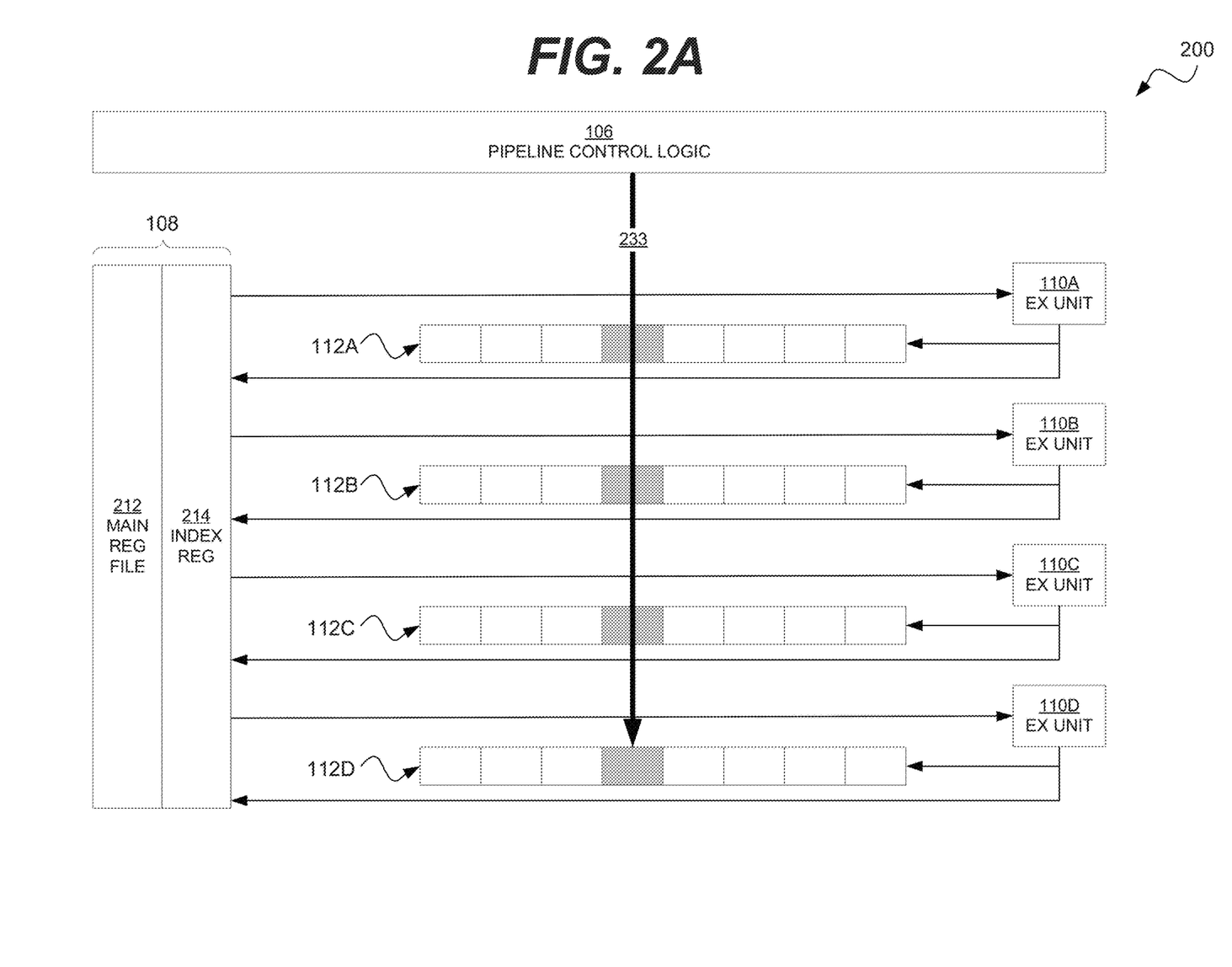
FIG. 2A is a block diagram of an example embodiment of a system in accordance with the disclosed subject matter.
Figure 2B:
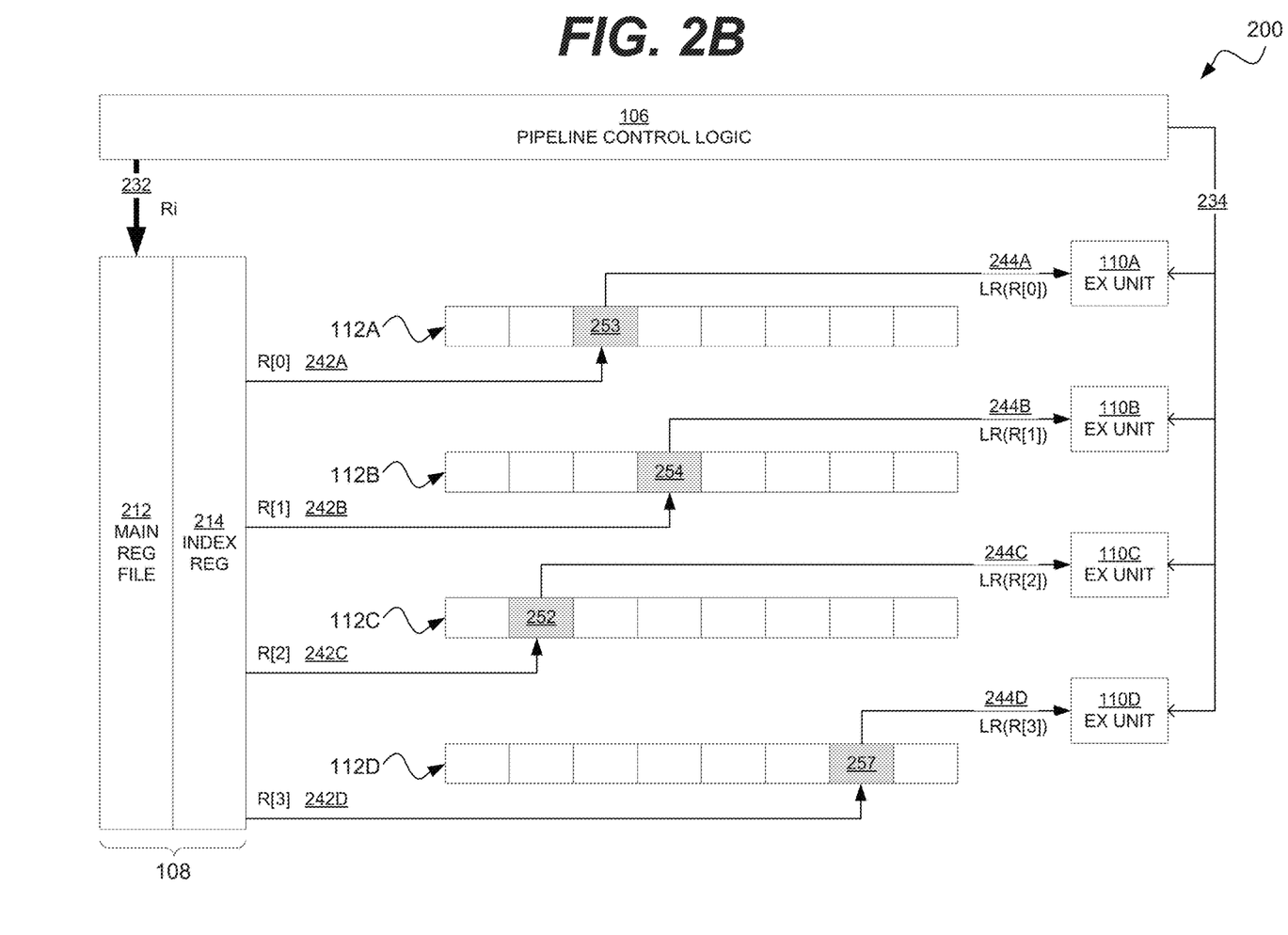
FIG. 2B is a block diagram of an example embodiment of a system in accordance with the disclosed subject matter.

FIG. 2A is a block diagram of an example embodiment of a system in accordance with the disclosed subject matter. In such an embodiment, the traditional operating mode is shown.

In such an embodiment, the system 200 may include the pipeline control logic 106, as described above. The system 200 may include various lanes of execution units 110, and their associated local register files 112.

The system 200 may include main register circuit 108, as described above. In the illustrated embodiment, the main register circuit 108 may include a main register file 212, configured to store data and shared by the execution unit lanes. The main register circuit 108 may also include an index register circuit 214, configured to store an active index or memory address for each local register file 112, and described more detail in reference to FIG. 2B.

In the illustrated embodiment, the indexing identifier or active memory address 233 to the local register files 122 is computed by the control logic circuit 106 and broadcasted across all lanes. In the illustrated embodiment, the fourth memory location is active across all local register files 112A, 112B, 112C, and 112D. The value stored there is simultaneously provided to all execution units 110A, 110B, 110C, and 110D.

FIG. 2B is a block diagram of an example embodiment of a system 200 in accordance with the disclosed subject matter. In such an embodiment, the per-lane operating mode is shown. In the illustrated embodiment, various signals have been to aid the illustrative nature of the diagram.

Again, in such an embodiment, the system 200 may include the pipeline control logic 106, as described above. The system 200 may include various lanes of execution units 110, and their associated local register files 112.

The system 200 may include main register circuit 108, as described above. In the illustrated embodiment, the main register circuit 108 may include a main register file 212, configured to store data and shared by the execution unit lanes. The main register circuit 108 may also include one or more index register circuit 214, configured to store an active index or memory address for each local register file 112.

In the illustrated embodiment, the control logic 106 may issue the index register identifier 232 to the main register circuit 108. In the parlance of the above example code, this may include the value Ri, which indicates the active index or memory address for each lane.

In such an embodiment, the main register circuit 108 may look up the active index or memory address for each lane in the index register circuit 214. The main register circuit 108 may then communicate this (signal 242) to each local register file 112. The local register file 112 may then provide (signal 244) the value stored there to the respective execution unit 110 for processing. Likewise, as described above, the control logic 106 may provide the execution units 110 with the instruction control signal 234.

In the illustrated embodiment, for lane 0 or A, the signal 242A or R[0] may indicate that the active memory location is 253, and location 253 may store the value represented as LR(R[0]). In the illustrated embodiment, for lane 1 or B, the signal 242B or R[1] may indicate that the active memory location is 254, and location 254 may store the value represented as LR(R[1]). In the illustrated embodiment, for lane 2 or C, the signal 242C or R[2] may indicate that the active memory location is 252, and location 252 may store the value represented as LR(R[2]). In the illustrated embodiment, for lane 3 or D, the signal 242D or R[3] may indicate that the active memory location is 257, and location 257 may store the value represented as LR(R[3]). It is understood that the above are merely a few illustrative examples to which the disclosed subject matter is not limited.

Figure 3:
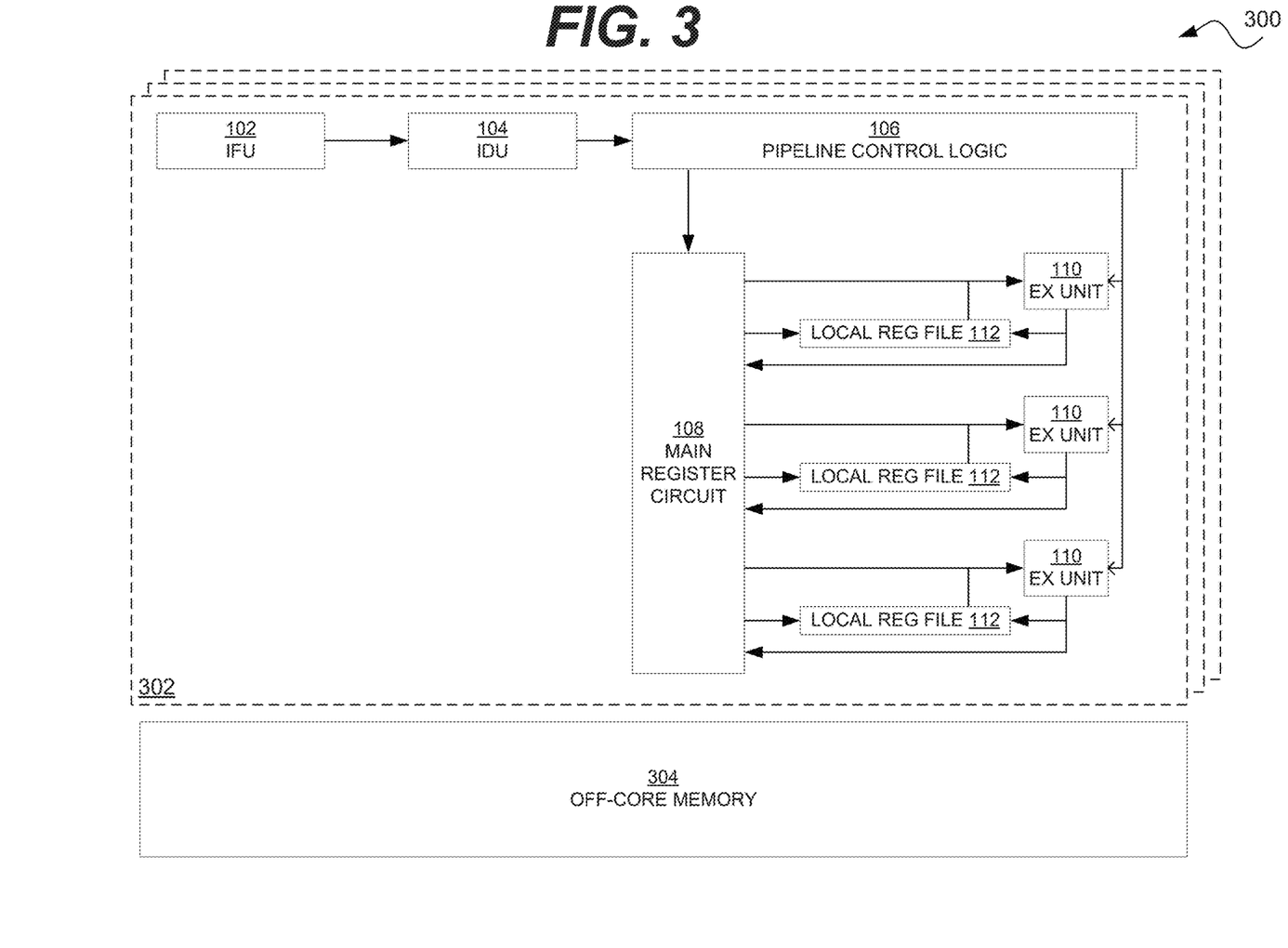
FIG. 3 is a block diagram of an example embodiment of a system in accordance with the disclosed subject matter.

FIG. 3 is a block diagram of an example embodiment of a system 300 in accordance with the disclosed subject matter. In the illustrated embodiment, the system 300 may include a system-on-chip (SoC), multi-chip module (MCM), other integrated circuit, or arrangement of integrated circuits.

In the illustrated embodiment, the system 300 may include a plurality of processor cores or processing circuits 302. As described above, in the illustrated embodiment, each core 302 may include an IFU 102, IDU 104, control logic 106, main register circuit 108, execution units 110, and local register files 112, among other components and circuits.

In the illustrated embodiment, the system 300 may also include an off-core memory circuit 304. As described above, this off-core memory 304 may be employed as a scratchpad or temporary storage for the control logic 106 when moving data or performing the register calculations. It is understood that the above is merely one illustrative example to which the disclosed subject matter is not limited.

Figure 4:
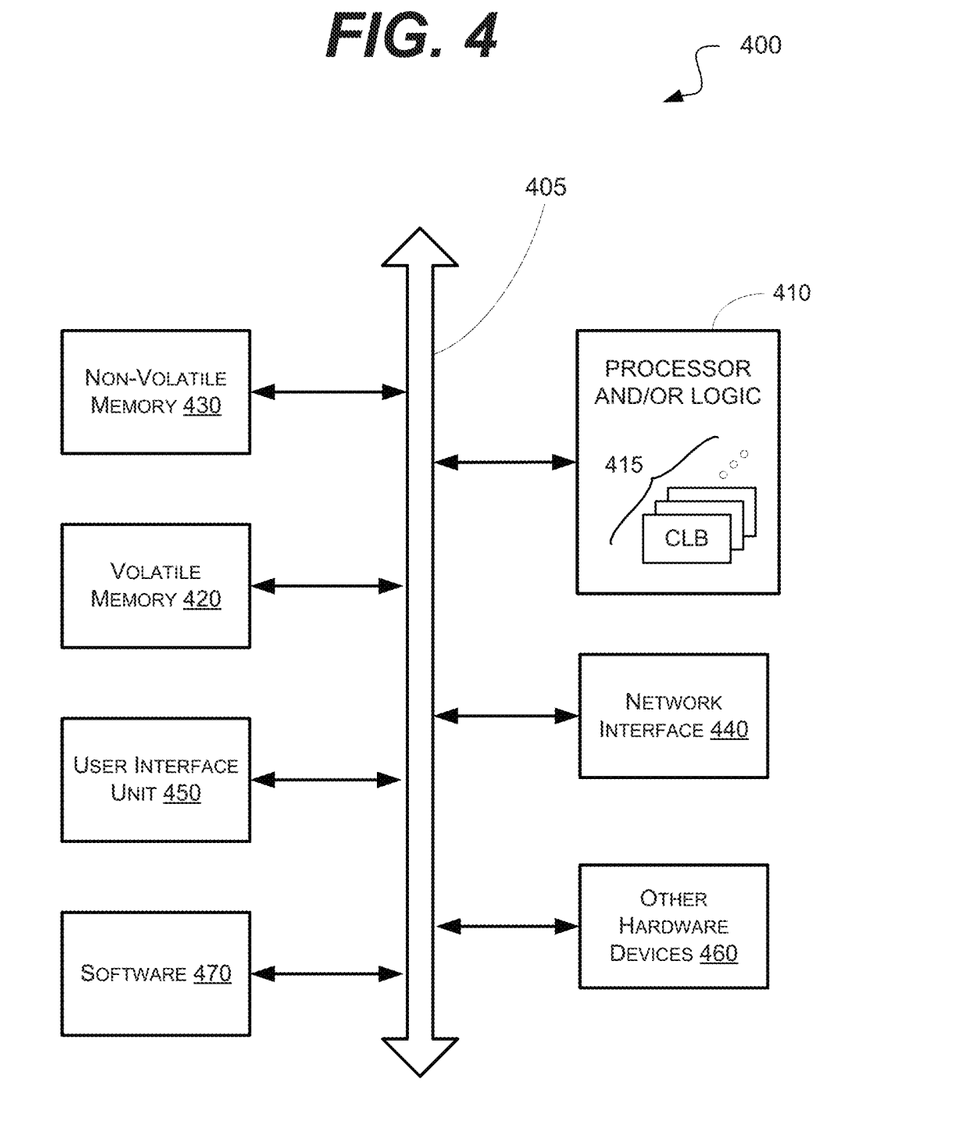
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
one or more execution unit circuits, each configured to access one or more pieces of data;
one or more local register file circuits, each associated with a respective execution unit circuit and each configured to store data for the respective execution unit; and
a main register circuit comprising:
a main register file circuit configured to store data that is shared by the execution unit circuits, and
a local index register circuit configured to map an index supplied by the main register file circuit to a storage location in the local register file circuits, and
wherein the main register circuit is configured to:
receive from a control circuit a request to access the storage location of the specified data, and
supply a target local register file circuit with the target local register file circuit's storage location for the specified data.

2. The apparatus of claim 1, wherein the local register file circuit(s) has an index-based storage location system, and
wherein each of the local register file circuit(s) is configured to access a piece of data independently of an active index of the other local register file circuit(s).

3. The apparatus of claim 1, wherein the apparatus comprises a hierarchical register file circuit, wherein the hierarchical register file circuit comprises the main register file circuit and the one or more local register file circuits.

4. The apparatus of claim 1, wherein the executions unit circuits comprise arithmetic logic unit (ALU) circuits.

5. The apparatus of claim 1, wherein the main register file is shared between the one or more execution unit circuits.

6. The apparatus of claim 1, further comprising the control circuit, wherein the control circuit is configured to allocate a single-instruction, multiple data (SIMD) instruction to at least a subset of the one or more execution unit circuits, and, as operands of the SIMD instruction, request access to pieces of data for the execution unit circuits.

7. The apparatus of claim 6, wherein the operand of the SIMD instruction includes a direct reference to the storage location in the plurality of local register files.

8. The apparatus of claim 1, wherein each of the local register file circuits' storage locations are determined by an index value that is determined and maintained without regard to the other local register file circuits' index value.

9. The apparatus of claim 1, wherein the main register circuit is configured to determine the target local register file circuit's storage location of the piece of data by only accessing the local index register circuit and without accessing an off-core memory.

10. A system comprising:
a processor core comprising:
one or more execution unit circuits, each configured to access one or more pieces of data;
one or more local register file circuits, each associated with a respective execution unit and each configured to store data; and
a main register circuit, the main register circuit comprising a local index register circuit configured to store, for each local register file, an active index value, and wherein configured to, in response to a request from a control circuit to access a target execution unit circuit, supply the active index value associated with the target execution unit circuit; and
an off-core memory circuit configured to store data.

11. The system of claim 10, wherein each of the one or more local register file circuits is configured to access, via the respective local register file circuit's active index value, a piece of data independently of the active index values of the other local register file circuits.

12. The system of claim 10, wherein the processor core comprises a hierarchical register file circuit, wherein the hierarchical register file circuit comprises a main register file circuit and the one or more local register file circuits.

13. The system of claim 10, further comprising the control circuit,
wherein the control circuit is configured to determine if an instruction is of a first type or a second type,
if the instruction is of the first type, compute an operand employing the off-core memory circuit, and
if the instruction is of the second type, directly request an active index from the main register circuit.

14. The system of claim 10, wherein the main register circuit comprising a main register file that is shared between the one or more execution unit circuits.

15. The system of claim 10, further comprising the control circuit, wherein the control circuit is configured to allocate a single-instruction, multiple data (SIMD) instruction to at least a subset of the plurality of execution unit circuits, and, as operands of the SIMD instruction, request access to data for the execution unit circuits.

16. The system of claim 15, wherein the operand of the SIMD instruction includes a direct reference to the storage location in the one or more local register files.

17. The system of claim 10, wherein each of the local register file circuits' storage locations are determined by an index value that is determined and maintained without regard to the other local register file circuits' index value.

18. The system of claim 10, wherein the main register circuit is configured to determine the target local register file circuit's storage location of the piece of data by only accessing the local index register circuit and without accessing the off-core memory circuit.

19. An apparatus comprising:
a plurality of execution unit circuits, each configured to access one or more pieces of data;
a plurality of local register file circuits, each associated with a respective execution unit and each configured to store pieces of data; and
a main register circuit comprising:
   a main register file circuit configured to store data for at least part of the plurality of execution unit circuits, and
   a local index register circuit configured to identify an active storage location in the plurality of local register files, and
a control circuit configured to:
   issue an instruction to a target execution unit circuit, and
   instruct the local index register circuit to access, at the active storage location, the local register file associated with the target execution unit circuit.

20. The apparatus of claim 19, wherein each of the local register file circuits' storage locations are determined by an index value that is determined and maintained without regard to the other local register file circuits' index value.

* * * * *